United States Patent [19]

Daniels

[11] Patent Number: 4,731,901

[45] Date of Patent: Mar. 22, 1988

[54] CASTOR WHEEL WITH NON CONTINUOUS RIBS FOR LUBRICANT

[75] Inventor: Raymond R. J. Daniels, Norfolk, England

[73] Assignee: Guy-Raymond Engineering Company Limited, Norfolk, England

[21] Appl. No.: 827,241

[22] Filed: Feb. 7, 1986

[30] Foreign Application Priority Data

Feb. 12, 1985 [GB] United Kingdom ................ 8503511

[51] Int. Cl.[4] ............................................. A47B 91/06
[52] U.S. Cl. ............................. 16/42 R; 16/DIG. 27
[58] Field of Search ..................... 16/36, 38, 39, 42, 45, 16/46, 274, DIG. 27

[56] References Cited

U.S. PATENT DOCUMENTS 3,304,354  2/1967  Hill et al. .................................. 16/42
3,662,428  5/1972  Koehl ....................................... 16/39
4,068,342  1/1978  Carrier ..................................... 16/38
4,069,543  1/1978  James ....................................... 16/42

FOREIGN PATENT DOCUMENTS 2620076  9/1977  Fed. Rep. of Germany .......... 16/36
2638854  3/1978  Fed. Rep. of Germany .......... 16/36
 320240 10/1929  United Kingdom .................... 16/36

Primary Examiner—M. Jordan
Attorney, Agent, or Firm—Cooper, Dunham, Griffin & Moran

[57] ABSTRACT

A moulded plastics article having a closed bore to receive a spindle, the bore being formed with at least one radially inwardly projecting annular rib adapted to locate in a circumferential groove in the spindle, characterized in that the or each rib is interrupted to form a gap for the passage of fluid from one side of the rib to the other when the spindle is inserted into the bore.

10 Claims, 7 Drawing Figures

CASTOR WHEEL WITH NON CONTINUOUS RIBS FOR LUBRICANT

FIELD OF INVENTION

The present invention is concerned with a moulded plastics article such as a wheel for a castor which is adapted to be mounted for rotation on a spindle or axle and with a method of manufacture thereof and with a method of attaching said article to a spindle.

DESCRIPTION OF PRIOR ART

There is a well known type of furniture castor which comprises a steel spindle or axle mounted on the castor body and two moulded plastics wheels mounted for rotation on the opposite ends of the spindle or axle. This type of castor has a number of advantages over more conventional castors but problems have been encountered in the manufacture of the wheels and in the assembly of the wheels onto the spindle or axle. In order to retain the wheel on the end of the spindle, the wheel is formed with an internal tubular boss, a bore within the boss and an annular rib within the bore which is adapted to locate in a circumferential groove on the end of the spindle. The provision of this rib in the bore, however, creates problems in moulding the wheel as it is difficult to withdraw the moulding core from the bore without damaging the rib unless the rib is relatively shallow.

It has also been found that, when the wheel is assembled on the spindle pressure builds up once the end of the spindle meets and seals against the rib which makes it difficult to insert the spindle fully and can sometimes lead to damage to the rib or the wheel itself. In many designs of castor wheel, the wall at the bottom of the bore is relatively thin and it has been known to fracture as a result of the pressure build up when the spindle is inserted into the bore. This problem is particularly acute if the spindle has been greased before it is inserted into the bore as the grease ensures a near perfect seal between the spindle and the rib on insertion.

In order to overcome these problems, it has been proposed to make the rib in the bore relatively shallow but this results in very poor retention of the wheel on the spindle and a risk that the wheel will come away from the spindle if it is subjected to heavy wear. It has also been proposed to form a pin hole in the end wall of the bore to release any build up of pressure but the pin-hole can always be seen on the outer face of the wheel and is therefore undesirable from a design point of view. It has also been proposed to form an axial groove in the outer cylindrical face of the steel spindle but this results in a very substantial increase in the cost of the spindle.

SUMMARY OF THE INVENTION

We have found that these problems can be overcome or substantially reduced by providing a moulded plastics article such as a castor wheel with a closed bore to receive a spindle, the bore being formed with at least one radially inwardly projecting annular rib adapted to locate in a circumferential groove in the spindle, characterised in that the or each rib is interrupted to form a gap for the passage of fluid from one side of the rib to the other when the spindle is inserted into the bore.

Preferably, the bore is formed with two similar ribs spaced axially along the bore and each of which is interrupted to form a gap for the passage of fluid from one side of the rib to the other when the spindle is inserted into the bore. In order to facilitate the spread of grease around the bore and spindle as the spindle is forced into the bore, the gap in one rib may be angularly displaced in relation to the gap in the other rib by approximately 180°.

We also provide a method of attaching a moulded plastics article, such as a castor wheel, of the type hereinbefore described, comprising the steps of:
depositing a quantity of grease in the bottom of said closed bore in said article;
inserting said spindle into said bore;
forcing said spindle past said rib in said bore, air being allowed to escape from said end of said bore through said gap in said rib so as to minimise build up of pressure at said end of said bore; and
forcing said spindle further into said bore until said rib locates in said groove in said spindle to retain said spindle in said bore and thereby compressing said grease between said end of said spindle and said end of said bore so as to force said grease between said spindle and the wall of said bore through said gap in said rib so as to lubricate a substantial length of the interface between said spindle and said wall of said bore.

We further provide a method of manufacturing a moulded plastics article, such as a castor wheel, of the type hereinbefore described wherein the closed bore is formed in a tubular boss, comprising the steps of:
forming the article in a mould cavity incorporating a core which forms the closed bore in the tubular boss;
ejecting the article from the mould cavity with the core still in place so that the wall of the tubular boss is free to expand radially outwardly, and
withdrawing the core from the bore in the boss, said gap in said rib or ribs allowing the passage of air past said ribs and minimising the build up of a vacuum at the end of said bore.

BRIEF DESCRIPTION OF THE DRAWINGS

An embodiment of the present invention will now be described with reference to the accompanying drawings, in which.

DESCRIPTION OF A SPECIFIC EMBODIMENT OF THE INVENTION

Figure 1:
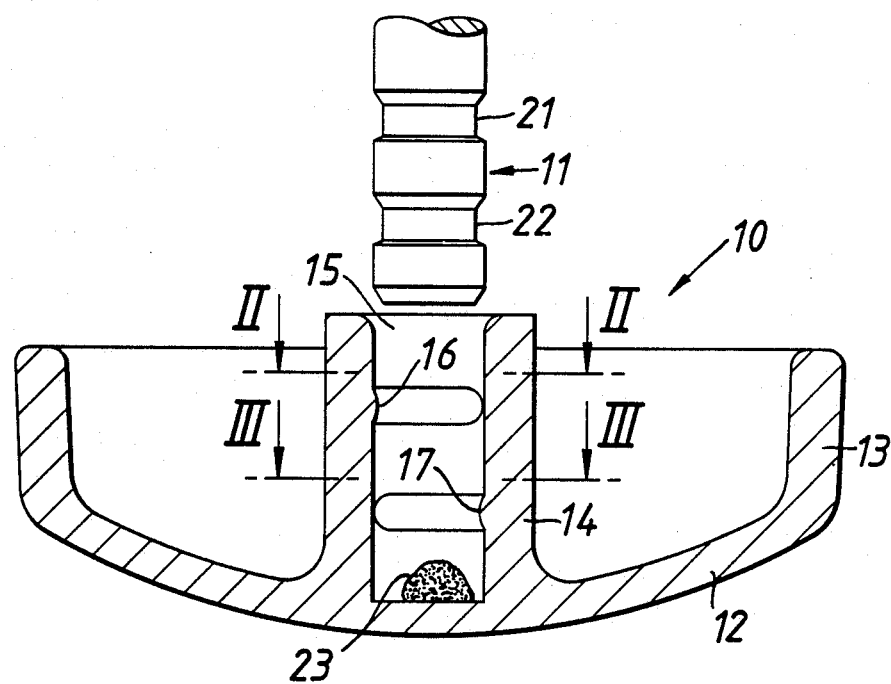
FIG. 1 is an elevation partly in section showing a castor wheel prior to its mounting on a spindle.

In the drawings a moulded plastics castor wheel is indicated generally at 10 which is adapted to be mounted on an end of a steel spindle or axle 11. The wheel 10 comprises an outer wall 12 which is outwardly convex, a circumferential flange 13 which forms the rolling surface of the wheel and an internal tubular boss 14. The boss 14 defines a closed bore 15 which is adapted to receive the spindle 11.

Figure 2:
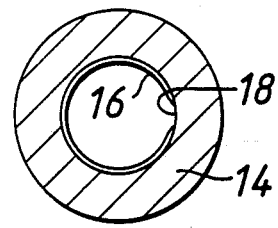
FIG. 2 is a section taken on the line II—II of FIG. 1.
Figure 3:
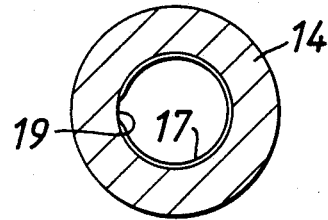
FIG. 3 is a section taken on the line III—III of FIG. 1.

The bore 15 is formed with two similar radially inwardly projecting annular ribs 16 and 17 which are spaced axially along the bore. As can be seen best from FIGS. 2 and 3, the ribs 16 and 17 are interrupted to form gaps 18 and 19, respectively, so positioned that they are angularly displaced by approximately 180°.

The spindle 11 is formed with a chamfered end 20 to facilitate insertion of the spindle into the bore 15 and past the ribs 16 and 17 and with two circumferential grooves 21 and 22 which are adapted to receive the ribs 16 and 17 when the spindle is inserted fully home into the bore 15.

In order to assemble the wheel 10 on the spindle 11, the spindle is pressed into the bore 15. Preferably, the spindle is a close fit within the bore so that the ribs 16 and 17 are compressed by the spindle and then spring back into the grooves 21 and 22, respectively, to retain the wheel securely on the end of the spindle while allowing free rotation of the wheel relative to the spindle. As the spindle is inserted into the bore and meets the first rib 16, fluid in the form of air or any liquid in the bore can pass between the rib and the spindle through the gaps 18 and 19 so that there is no build up of pressure in front of the leading end of the spindle. This ensures that the spindle can be relatively easily inserted into the bore without any risk of the ribs being damaged or the wall 12 in the area of the end of the bore being fractured or distorted.

Figure 4:
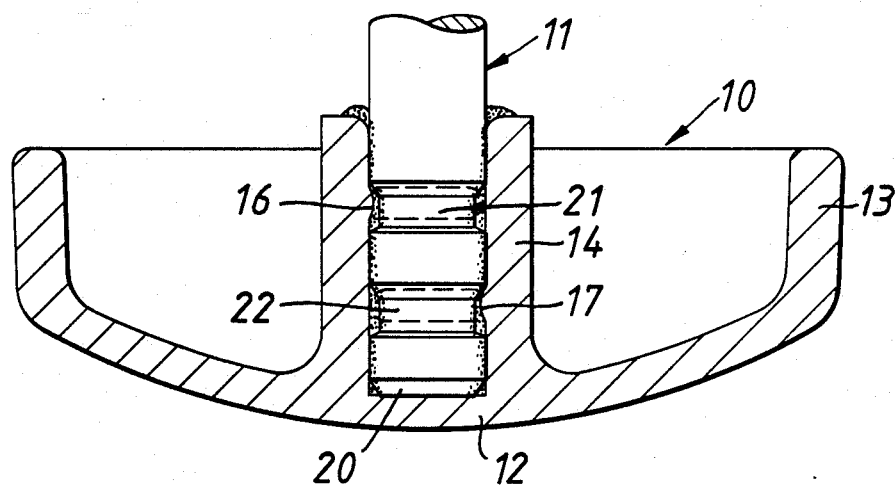
FIG. 4 is an elevation similar to FIG. 1 showing the castor wheel mounted on the spindle.
Figure 5:
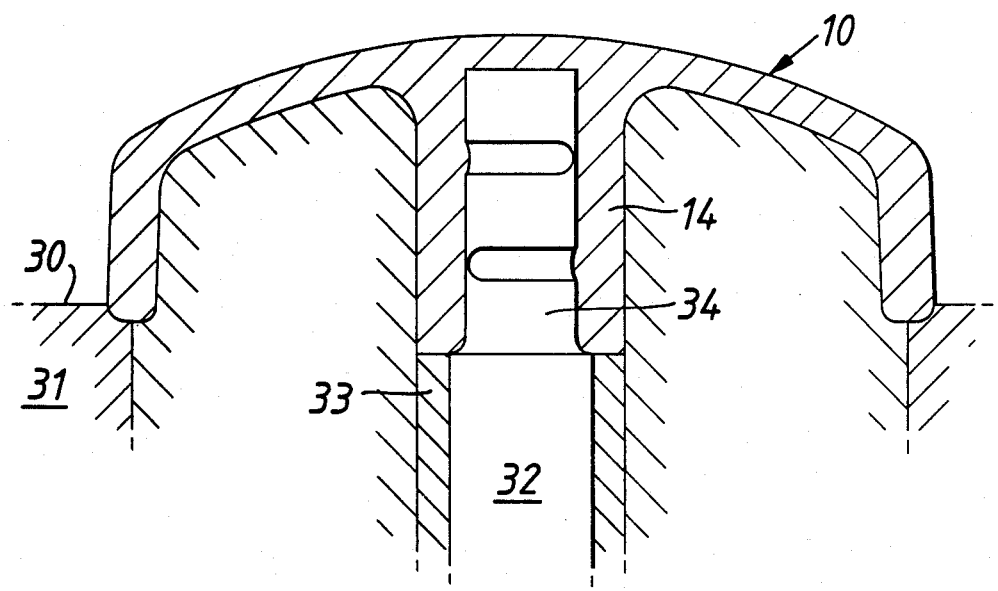
FIG. 5 is a section through the mould cavity showing the castor wheel of FIGS. 1 to 4 prior to its ejection from the cavity.

In order to facilitate the free rotation of the wheel on the spindle it is desirable to grease the spindle. This can be done as shown in FIGS. 1 and 4 by depositing a small quantity of grease 23 in the bore before the spindle is inserted. As the spindle is pressed home the grease is compressed and forced back along the wall of the bore through the gaps 18 and 19 in the ribs. Because the gaps are displaced angularly, the grease will be spread evenly over the whole of the wall of the bore and the complementary surfaces of the spindle ensuring that the assembly is effectively lubricated.

The castor wheel 10 is moulded in a die comprising die plates 30 and 31 which form the mould cavity, a core 32 slideably mounted in a sleeve 33 and a spigot 34 on the end of the core 32 which forms the bore 15 in the tubular boss 14 of the castor wheel.

Figure 6:
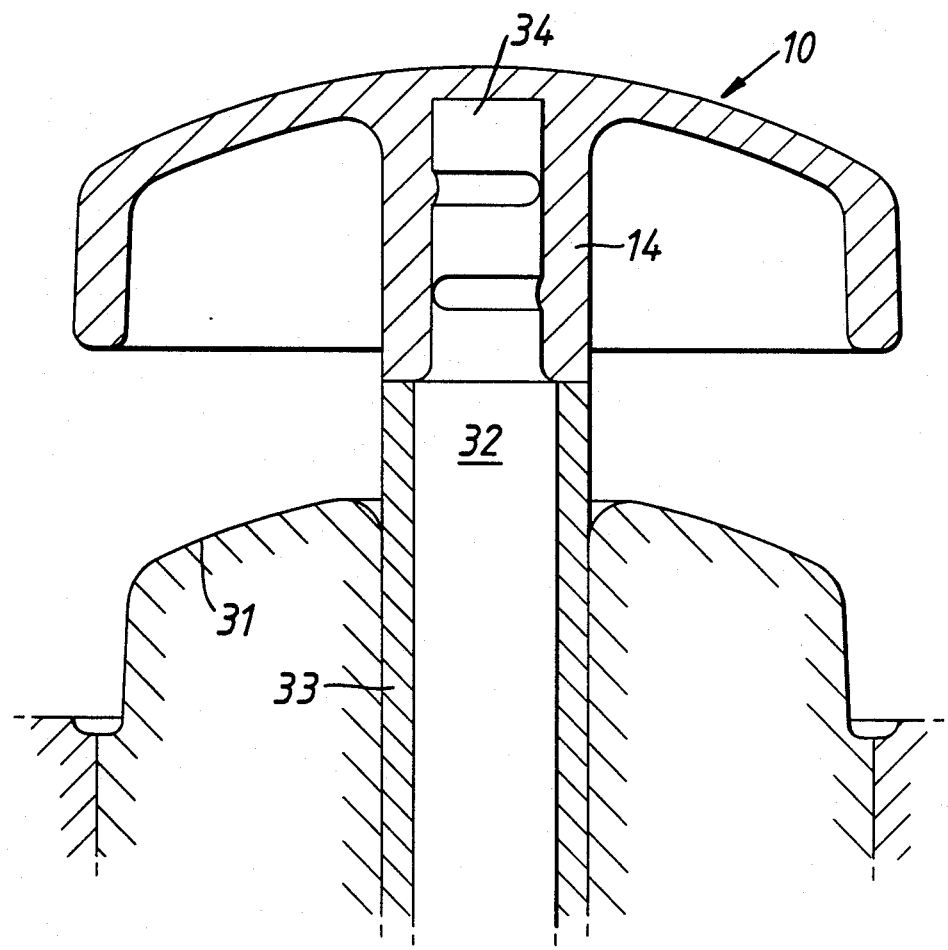
FIG. 6 is an elevation similar to FIG. 5 showing the castor wheel ejected from the cavity.
Figure 7:
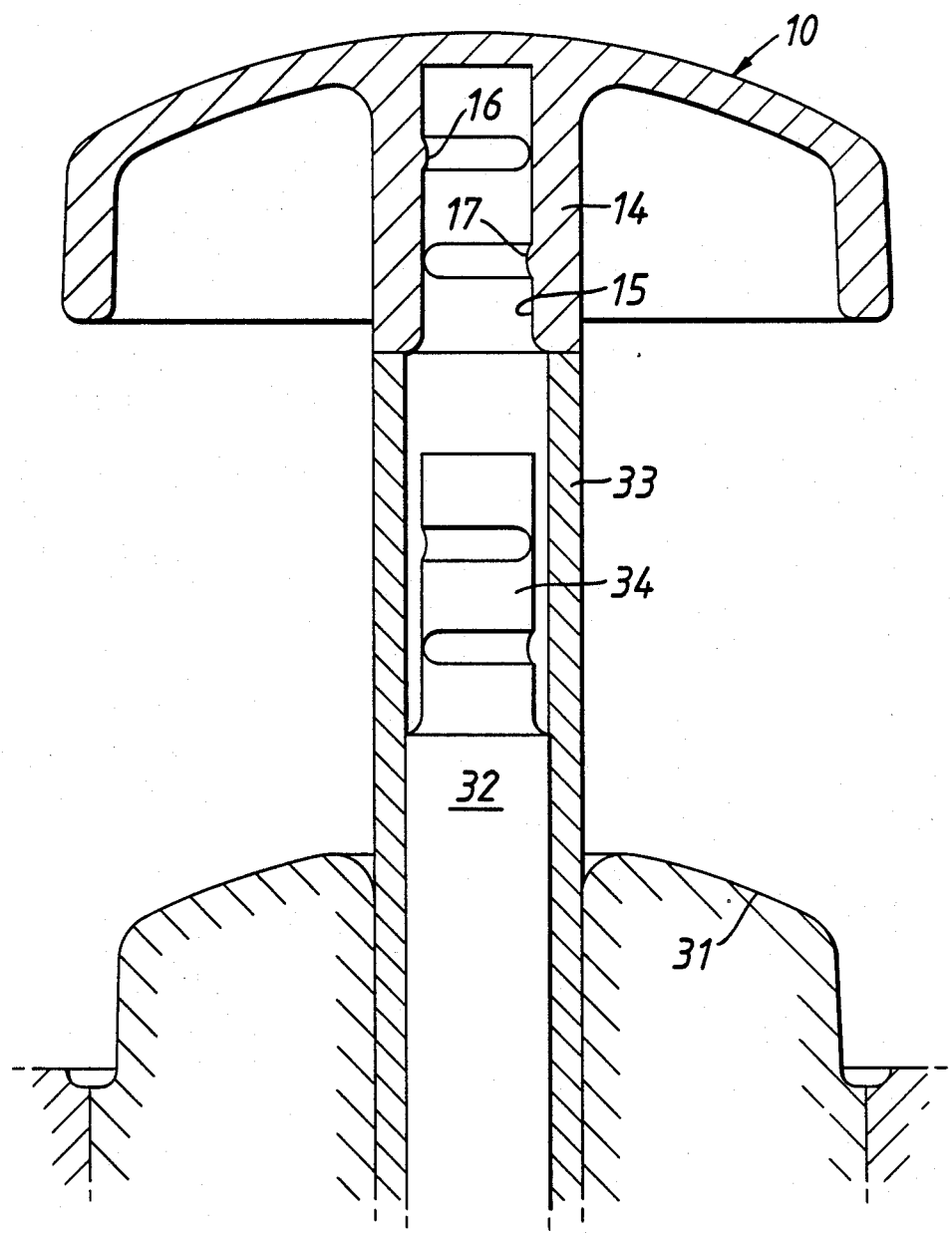
FIG. 7 is a view similar to FIGS. 5 and 6 showing the final step in the moulding process with the core withdrawn from the bore of the castor wheel.

When the castor wheel has been formed in the die cavity, the die plate 30 is removed and the sleeve 33, core 32 and castor wheel 10 are moved forwardly away from the die plate 31 into the position shown in FIG. 6. In this position, the tubular boss 14 of the castor wheel is no longer constrained by the die plate 31 and can expand radially outwardly. The sleeve 33 which surrounds the core 32 is then moved forwardly again relative to the core 32 so as to force the castor wheel off the spigot 34 as shown in FIG. 7. As the castor wheel is forced off the spigot 34, the tubular boss 14 of the castor wheel will expand slightly to enable the spigot 34 to be withdrawn from the bore 15 without any risk of damage to the ribs 16 and 17. This method of moulding the castor wheel 10 enables substantially larger and more protuberant ribs to be moulded on the internal surface of the bore than has hitherto been practical.

It will be understood that, while the present invention is particularly advantageous in relation to castor wheels, it is not limited in its application to these particular articles and may be applied to any moulded plastics article which is designed to be mounted for rotation on a spindle or axle.

It is also envisaged that the bore may be provided with only one rib or with a plurality of ribs, for instance three, four or five ribs. If only one rib is provided in the bore it may be necessary, in order to ensure sufficient retention, for the rib to be relatively larger. In this case the method of manufacture described herein is particularly advantageous because it facilitates withdrawal of the core from the bore during the moulding process, even if the rib is relatively larger and protrudes significantly into the bore.

If a plurality of ribs are provided, that is two or more, then it is preferable to ensure that the gaps are sequentially and equi-angularly spaced around the axis of the bore to facilitate the spread of grease around the spindle as the spindle is inserted into the bore. For instance if three sets are provided the gaps will be spaced at 120° intervals around the axis and if there are four ribs they will be spaced by 90° around the axis.

The castor wheel disclosed herein can be manufactured from any suitable synthetic plastics material such as nylon or polypropylene and the spindle or axle is preferably formed from steel but may be made from any other suitable material having the required characteristics.

I claim:

1. A moulded plastics article having a closed bore for receiving a spindle, said bore being formed with at least one radially inwardly projecting annular rib, said rib being adapted to locate in a circumferential groove in the spindle, wherein the or each said rib is interrupted to form a gap for the passage of fluid from one side of said rib to the other when the spindle is inserted into said bore.

2. An article as claimed in claim 1 wherein the bore is formed with a plurality of similar ribs spaced axially from one another along said bore and said gaps in said ribs are equi-angularly spaced around the axis of said bore.

3. An article as claimed in claim 2, wherein said bore is formed with two similar ribs spaced axially from one another along said bore and said gap in one rib is angularly displaced in relation to said gap in said other rib by approximately 180°.

4. An assembly comprising an article as claimed in claim 1 mounted for rotation on a spindle, wherein said spindle is formed with at least one circumferential groove and said spindle is located in said bore in said article with the or each said rib located in the or each said groove in said spindle to resist removal of said spindle from said bore.

5. A castor wheel having a closed bore for receiving a spindle which has a first circumferential groove, wherein said castor wheel has in said bore a first radially inwardly projecting rib which is positioned and dimensioned to fit in said first groove when the spindle is inserted in said bore and wherein said first rib is interrupted to leave a gap in the circumference thereof to allow for the axial passage of fluid from one side of said rib to the other through said gap when the spindle is inserted in said bore and the rib fits in said groove, said gap extending circumferentially over a distance which is small as compared with the circumferential extent of the rib.

6. A castor wheel as in claim 5 in which said bore is for receiving a spindle having a second circumferential groove which is axially spaced from said first circumferential groove, wherein said castor wheel includes a second rib in said bore which is similar to and is axially spaced from said first rib and is positioned and dimensioned to fit in said second groove when the spindle is inserted in said bore and wherein the gaps of the first and second ribs are angularly displaced from each other.

7. A castor wheel as in claim 6 in which said gaps are angularly spaced from each other by approximately 180°.

8. A assembly comprising a castor wheel having a closed bore and spindle which has a first circumferential groove, wherein said castor wheel has in said bore a first radially inwardly projecting rib which is positioned and dimensioned to fit in said first groove when the spindle is inserted in said bore and wherein said first rib is interrupted to leave a gap in the circumference thereof to allow for the axial passage of fluid from one side of said rib to the other through said gap when the spindle is inserted in said bore and the rib fits in said groove said gap, said gap extending circumferentially over a distance which is small as compared with the circumferential extent of the rib.

9. An assembly as in claim 8 in which said spindle has a second circumferential groove which is axially spaced from said first circumferential groove and said castor wheel includes in said bore a second rib which is similar to and is axially spaced from said first rib and is positioned and dimensioned to fit in said second groove when the spindle is inserted in said bore and wherein the gaps of the first and second ribs are angularly displaced from each other.

10. An assembly as in claim 9 in which said gaps are angularly spaced from each other by approximately 180°.

* * * * *